Patented Nov. 29, 1927.

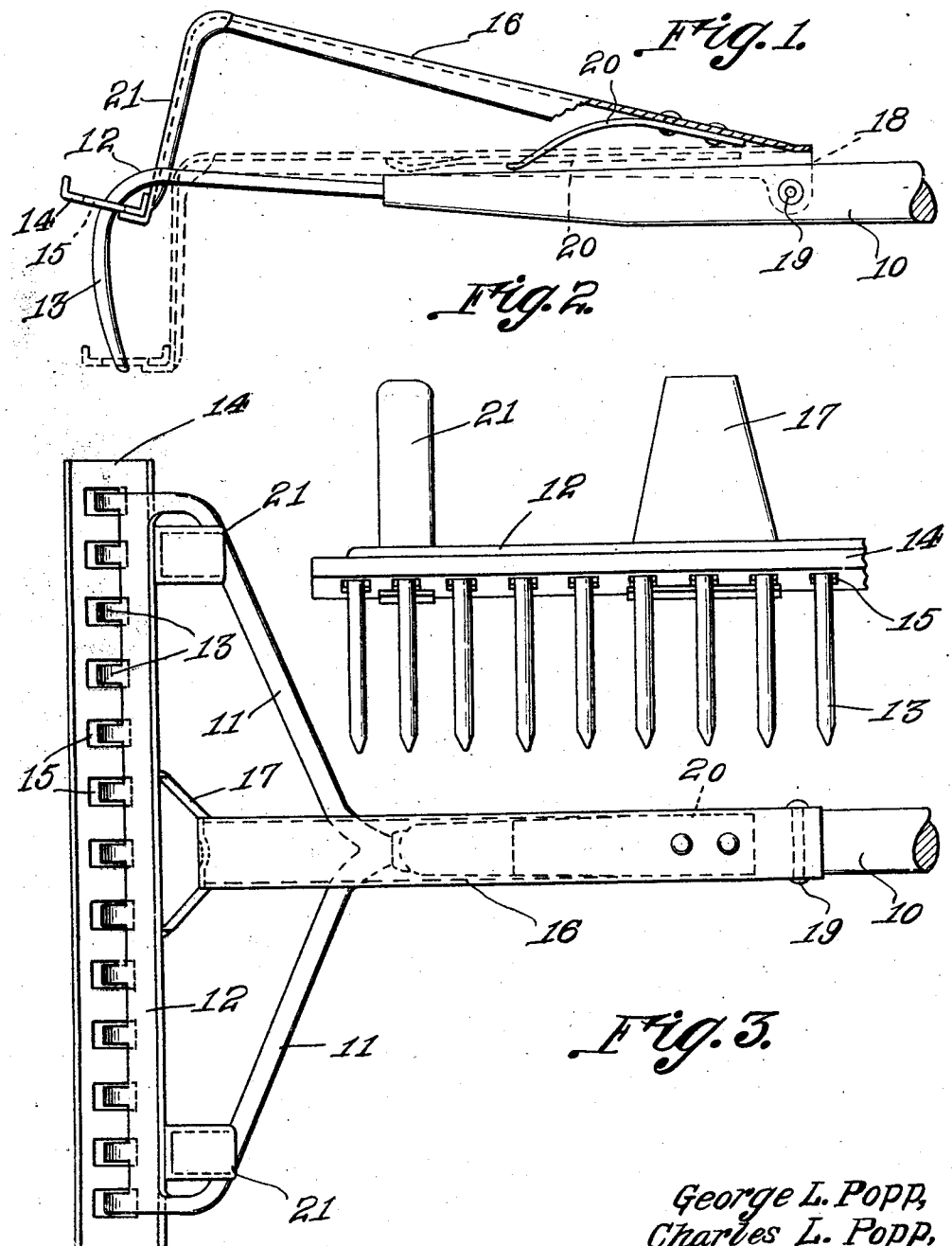

1,651,291

UNITED STATES PATENT OFFICE.

GEORGE L. POPP AND CHARLES L. POPP, OF JACKSON, MICHIGAN.

RAKE CLEANER.

Application filed October 26, 1925. Serial No. 64,882.

This invention relates to improvements in cleaners for use upon rakes and similar implements and it contemplates the provision of a plate having a plurality of openings therein for receiving the tines of a rake for preventing the accumulation of grass and the like from between the upper end of the tines.

Another object of our invention is the provision of resiliently mounted arms included upon the rake and handle and associated with the apertured plate whereby the rake in collecting débris or other extraneous matter between the tines therefor may be readily and easily removed without the necessity of the persons using the rake from extracting such matter by hand from the tines in so far as all that is necessary is to reverse the rake and strike the supporting arms for the plate upon the ground whereby the apertured plate receiving the tines of the rake therethrough will move upwardly toward the sharpened end portion of the tines and readily and easily remove such débris and extraneous matter from the tines therefor.

With the above and other objects in view, the invention further includes the following novel features and details of construction, to be hereinafter more fully described, illustrated in the accompanying drawing and pointed out in the appended claim.

In the drawing:—

Figure 1 is a fragmentary side elevation of a rake showing the different positions of our invention so outlined in dotted lines.

Figure 2 is a fragmentary end elevation of a rake having our present invention applied thereto.

Figure 3 is a top plan view of a rake with the invention applied.

Referring to the drawing in detail, wherein like characters of reference denote corresponding parts, the reference character 10 indicates a rake handle having arms 11 extending outwardly and obliquely from the forward end thereof and associated with the respective end portions of a plate or bar 12 having a plurality of spaced parallel tines 13 depending therefrom. All the above is of usual and well known construction and forming no part of the present invention for Letters Patent but being merely shown for purposes of illustration in bringing forward the novel advantages of the above entitled invention.

The invention resides in the provision of a plate 14 of any desired shape of configuration but in this instance being channeled and having a plurality of openings 15 arranged at corresponding distances with respect to the tines 13 extending from the bar or plate 12 and being of such dimensions as to allow the channel plate 14 to move upwardly and downwardly thereupon without sticking to the respective tines 13.

A channel plate 16 having a forward offset end portion 17 is secured intermediate the length and to the inner edge of the channel plate 14 with its inner free end terminating in spaced parallel apertured ears 18 and receiving a portion of the rake handle 10 therebetween for the reception of a pivot pin 19. A leaf spring 20 having its inner end secured within the channel bar 16 and its forward end tensioned against the upper side of the rake handle 10 normally holds the channel plate 14 in the position as clearly illustrated in Figure 1 of the drawing. The channel plate 14 further includes upwardly extending bars 21 provided adjacent its end upon its rear free edges and extending upwardly to the approximate height of the forward end portion of the channel bar 16.

In the use and operation of the present invention it is clearly apparent and manifest that when any extraneous matter has collected between the tines 13 of the rake beneath the channel plate 14 that it is not necessary to use the hand in the removal of such matter as the rake may then be turned up side down and the forward end portion of the channel bar 16 and the upwardly extending bars 21 struck upon the ground or stress applied thereto greater than the tension of the leaf spring 20. The channel plate 14 will be forced into the dotted line position as clearly illustrated in Figure 1 of the drawing resulting in the removing of all débris and extraneous matter so collected between the tines 13 of the rake.

The invention is susceptible of various changes in its form, proportions and minor details of construction, and the right is hereinafter reserved to make such changes as properly fall within the scope of the appended claim.

Having thus described the invention, what is claimed is:—

A rake cleaner comprising a supporting plate laterally curved throughout the major portion of its length to receive a rake handle therein, said plate being provided with depending ears pivotally connected with said handle, a forwardly and downwardly offset portion carried upon the forward end of the plate, an elongated apertured plate carried by the offset portion adapted to receive the tines of the rake within the apertures thereof, a leaf spring carried upon the underside of the supporting plate and abutting the rake handle to normally hold the elongated plate in elevated position, and upwardly extending bars carried at the outer ends and rear sides of the elongated plate to facilitate movement of the elongated plate.

In testimony whereof we affix our signatures.

GEORGE L. POPP.
CHARLES L. POPP.